United States Patent Office 3,457,319
Patented July 22, 1969

3,457,319
OLIGOMERIZATION PROCESS AND CATALYST FOR USE IN SAME
Jerome Robert Olechowski, Contour, and Sterling Frank Chappell III, Lake Charles, La., and John J. Hawkins, Santa Ana, Calif., assignors to Columbian Carbon Company, New York, N.Y., a corporation of Delaware
No Drawing. Filed June 13, 1966, Ser. No. 556,866
Int. Cl. C07c *11/16, 3/10*
U.S. Cl. 260—677                              18 Claims

ABSTRACT OF THE DISCLOSURE

Processes are described for the oligomerization of conjugated aliphatic dienes in the presence of a catalyst composition derived from a hydrocarbyl aluminum compound and a complex of certain metals, in their zero valent state, with a molecular ligand; e.g. triethyl aluminum plus bis (triphenylphosphite) iron tricarbonyl. The use of such catalysts in the production of linear and cyclic oligomers and co-oligomers of butadiene is illustrated, as is the exchange of ligands in iron (0) complexes and the formation of such complexes by the reduction of an iron salt in the presence of the molecular ligand.

---

It is known to oligomerize conjugated diene compounds to cycloolefins using certain zero valent nickel complexes as catalysts. Such catalysts are disclosed, for example, in U.S. Patents 2,964,575; 2,972,640; 2,991,-317; 3,004,081; 3,152,158; 3,187,062 and others. It is not possible to produce predominently acyclic oligomers of conjugated dienes employing these zero valent nickel catalysts.

It is, accordingly, an object of the invention to provide a process for preparing predominently acyclic oligomers of conjugated dienes.

It is another object of the invention to provide a process for producing linear acyclic dimer products of conjugated dienes in good yield.

It is still another object of the invention to provide a process for preparing 1,4-unsaturated acyclic dienes by the co-oligomerization of conjugated dienes with ethylene.

Still other objects and advantages of the invention will become apparent to those skilled in the art from the following detailed description thereof.

The above objects of the invention are accomplished by oligomerizing a conjugated diene in the presence of a catalyst composition comprising an aluminum compound and a complex of a zero valent metal selected from the group consisting of vanadium, manganese, rhenium, iron, ruthenium, osmium, cobalt, rhodium and iridium. For the purpose of simplicity, the above-listed metals will sometimes be referred to hereinafter as "metal." The preferred zero valent metal component of the complex utilized in the practice of the invention is iron.

The conjugated diene utilized as the starting material for this invention is preferably 1,3-butadiene. However, other 1,3-dienes are also useful, particularly 2-methyl-1, 3-butadiene (isoprene); 2-chloro-1,3-butadiene (chloroprene); 2,3-dichloro-1, 3-butadiene; 1,3-pentadiene (piperylene); 2,3-dimethyl-1,3-butadiene; and phenyldiolefins. Partially substituted halogen derivatives may be used, including mixed halogen derivatives such as chlorofluoro-1,3-butadienes. Other open chain conjugated dienes such as 2,4-hexadiene are also somewhat useful. If desired, peroxides may be removed from the diene feed by treatment with ferrous salts, thiosulfates, or sulfites according to available methods.

As previously noted, the conjugated dienes may be oligomerized in accordance with this invention to produce predominently acyclic compounds. For example, 1,3-butadiene may be converted to high yields of linear acyclic dimer, e.g. 1,3,6-octatriene, along with 3-methyl-1,4,6-heptatriene.

The invention is also useful in the co-oligomerization of conjugated dienes with ethylene to produce predominently 1,4-unsaturated acyclic dienes. Thus, for instance, a mixture of 1,3-butadiene and ethylene may be oligomerized by the present process to 1,4-hexadiene, a compound which is of interest as a third monomer in the production of sulfur-curable ethylene-propylene elastomers.

Preferably, the metal complex of the catalyst composition is a complex of the metal in its zero valence state with one or more of the following molecular ligands: carbon monoxide, triorgano esters of trivalent Group V–A elements, conjugated aliphatic diene compounds, cycloaliphatic compounds containing at least two ethylenic double bonds, functionally-substituted olefins, hydrocarbyl esters of sulfur acids and heterocyclic compounds.

Suitable triorgano esters of trivalent Group V–A elements include, for example, those corresponding to the formulae:

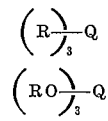

wherein R is a hydrocarbyl radical, preferably an aryl radical, and Q is a Group V–A element, preferably phosphorus, arsenic or antimony. Illustratively, specific compounds of this type which may be used with advantage as molecular ligands are: triphenyl phosphine; triphenyl phosphite, tripropyl phosphite; triphenyl arsine; tricyclohexyl arsenite; tri-p-tolyl stibine and tri-i-butyl antimonite.

The conjugated aliphatic dienes useful as molecular ligands are the starting materials noted above.

The cycloaliphatic compounds containing at least two double bonds may comprise one or more carbocyclic rings, the unsaturation being in a single ring or in adjoining rings. Thus bridge-ring multi-enes such as bicyclo (2.2.1) hepta-2,5-diene (norbornadiene); 2-methylnorbornadiene; 2-propylnorbornadiene; 2-i-propylnorbornadiene; 2-n-butylnorbornadiene; 2-i-butylnorbornadiene; 2-t-butylnorbornadiene; 2 - n - amylnorbornadiene; 2-(3-methylbutyl) norbornadiene; 2-neopentylnorbornadiene; 2-n-hexylnorbornadiene; 2 - n - octylnorbornadiene; 2-n-hexylnorbornadiene; 2 - n - octylnorbornadiene; 2 - n-nonylnorbornadiene; 2 - n - dodecylnorbornadiene; 2-n-heptadecylnorbornadiene; bicyclopentadiene; bicyclo(2.2.2)octa-2,5-diene and bicyclo (3.2.1) octa-2,5-diene may be employed, for instance. Furthermore, single ring carbocyclic multi-enes may be used including 1,5-cyclooctadiene; 1,3-cyclooctadiene; dimethyl-1,5-cyclooctadiene; 1,5,9-cyclododecatriene; 1,5 - cyclodecadiene; 1,6-cyclodecadiene; 1,5-cyclododecadiene; 1,3-cyclododecadiene; 1,3-cyclohexadiene; and cyclopentadiene may be used.

Functionally-substituted olefins useful as molecular ligands in preparing the metal (0) complexes include compounds containing α,β-unsaturation with respect to the functional group and tetrahaloethylene. Accordingly, compounds such as acrylonitrile, acrolein, crotonaldehyde, cinnamaldehyde, mesityl oxide, tetrafluoroethylene, tetrachloroethylene, etc., may be satisfactorily employed.

Suitable heterocyclic compounds include thiophene; pyrrole; 2-chlorothiophene; 2-pyrrole aldehyde; furan; furfural; tetrahydrofuran; pyridine; α-picoline; γ-pyran; α-pyran and the like.

Suitable hydrocarbyl esters of sulfur acids include the sulfoxides and sulfides, such as dimethylsulfoxide and dimethylsulfide.

The preferred aluminum compounds employed in conjunction with the metal (0) complexes in the catalyst compositions of the invention may be represented by the formula:

$$R_aAlX_b$$

wherein R is a hydride or hydrocarbyl radical, X is a halide or hydrocarboxy radical, $a$ is from 1 to 3, $b$ is from 0 to 2 and the sum of $a$ plus $b$ is 3. Illustrative of such compounds are trimethylaluminum; triethylaluminum; tri-i-butyl aluminum; trioctyl aluminum; tridodecyl aluminum; tricyclohexyl aluminum; triphenyl aluminum; tritolyl aluminum; pentoxydiethyl aluminum; diethoxyethyl aluminum; butyl aluminum dihydride; diethylphenyl aluminum; aluminum trihydride; diethyl aluminum chloride; monoethyl aluminum dichloride and ethyl aluminum sesquehalide, i.e. a mixture of diethyl aluminum chloride and ethyl aluminum dichloride or a mixture of triethyl aluminum and aluminum trichloride. Particularly preferred aluminum compounds for the purposes of this invention are aluminum trihydride and aluminum trialkyls, with the aluminum trialkyls being particularly preferred.

The catalyst compositions of the invention may be prepared by a number of suitable methods. Thus, one suitable catalyst composition is prepared by mixing the aluminum compound with a metal (0) carbonyl. Illustrative metal carbonyls are: $Ru(CO)_5$; $Os(CO)_5$; $Ir_2(CO)_8$; $Os_2(CO)_9$; $Ru_2(CO)_9$; $Ru_3(CO)_2$; $Mn_2(CO)_{10}$; $Fe(CO)_5$; $Fe_2(CO)_9$; $Fe_3(CO)_{12}$; $Co_2(CO)_8$; and $Co_4(CO)_{12}$. The iron carbonyls, especially $Fe(CO)_5$, are preferred.

Other metal (0) complexes suitable for use in conjunction with aluminum compounds in the catalyst compositions employed in the practice of the present process may be prepared by replacing one or more carbonyl groups of the metal carbonyl with the above-noted molecular ligands in accordance with known techniques. For example $Fe(CO)_5$ may be interacted with triphenylphosphine to produce bis-triphenylphosphine iron tricarbonyl. Likewise, $Fe(CO)_5$ may be reacted with triphenylphosphite to produce bis-triphenylphosphite iron tricarbonyl. Another suitable zero valent metal complex is the interaction product of bicyclo (2.2.1) hepta-2,5-diene and $Fe(CO)_5$. Complexes derived from cyclooctadiene and iron pentacarbonyl are also suitable for use in the catalyst compositions of this invention.

In preparing the catalyst compositions, the metal (0) carbonyl may be mixed with the aluminum compound, and if desired, other molecular ligands, e.g. triphenylphosphine, in an inert solvent. Suitable solvents are, for instance, benzene, toluene, petroleum naphtha, hexane, heptane, isooctane, cyclohexane, etc. The molecular ligands may also be employed in lieu of an inert solvent. Illustratively, cyclooctadiene, thiopene and bicyclo(2.2.1)hepta-2,5-diene may be used as the solvent for the metal (0) carbonyl and the aluminum compound. It is also feasible to add the metal (0) carbonyl and the aluminum to the monomer of the oligomerization reaction in its liquid form. Thus, the carbonyl and aluminum compound may be mixed with an excess of liquid butadiene, whereby a butadiene-modified metal (0) complex is formed which catalyzes the oligomerization of the remaining butadiene.

In addition to adding an aluminum compound to a metal (0) carbonyl or to a modified metal (0) carbonyl complex, as described above, the catalyst compositions may also be prepared by interacting a compound of the metal in its positive valence state, an aluminum compound reducing agent and one or more of the previously-noted molecular ligands.

The metal compounds employed in this procedure are preferably ferric compounds, including iron (III) inorganic and iron (III) organic compounds. Illustrative of iron (III) inorganic compounds which can be used are: ferric fluoride, ferric iodide, ferric bromide, ferric chloride, ferric oxide, ferric hydroxide, ferric hydrophosphite, ferric othophosphate, ferric thiocyanate, ferric ferricyanide, ammonium ferricyanide, potassium ferric sulfate and others.

Examples of iron (III) organic compounds which can be used in this invention include ferric salts of acetic, propionic, hexanoic, ethylhexanoic, oleic, stearic, oxalic, suberic, benzoic, trimellitic, citric, lactic, and tall oil acids, as well as ferric derivatives of alcohols, ketones, aldehydes and nitrogen-containing organics, such as dimethylglyoxime, 8-hydroxy quinoline, glycene, nitrosophenylhydroxylamine, etc. and complexes of organic molecules with inorganic ferric salts, such as tetrapyridine ferric chloride.

From a practical point of view it is desirable to prepare the catalyst composition in a solvent from one or more of the components. Suitable solvents are those noted above. Iron (III) compounds which have a significant solubility in the solvents, are, therefore, highly desirable. Such preferred iron (III) compounds include: ferric halides, such as ferric chloride; ferric salts of monobasic carboxylic acid, preferably having at least six (6) carbon atoms, such as ferric naphthenate; and ferric chelates in which the organic chelating group is bonded to the iron with both conventional and coordination bonds, such as ferric acetylacetonate.

Any of the aforementioned aluminum compounds may be employed to reduce the metal to its zero valence state, although we prefer to use either a trihydrocarbyl aluminum compound or aluminum trihydride for this purpose. The trihydrocarbyl aluminum compounds, and particularly tri (lower) alkyl aluminum such as triethyl aluminum, are especially preferred. Carbon monoxide or the trihydrocarbyl esters of Group V-A elements are the preferred molecular ligands.

The ratio of the components in the catalyst system is a particularly important consideration in the practice of the present invention. Accordingly, we utilize a molar ratio of aluminum to metal of from about 0.5:1 to about 20:1, with the range of 2:1 to 10:1 being particularly preferred. When the catalyst composition is prepared by reducing a metal (positive valence) compound in the presence of one or more molecular ligands, the molar ratio of aluminum compound to metal compound is preferably at least 1:1, e.g. from 2:1 to 10:1, and the molecular ligand is preferably employed in an amount such that the molar ratio of the molecular ligand, e.g. Group V-A metal trihydrocarbyl ester, to the metal compound is at least about 1:1. The optimum ligand:metal ratio is of course, at least partially dependent on the coordination number of the metal. When the metal is iron, the molar ratio of molecular ligand to iron is advisably from about 1:1 to about 5:1 for optimum results.

We have found, quite unexpectedly, that in the homo-oligomerization of 1,3-butadiene, the use of aluminum to metal molar ratios with the above-recited ranges results in the production of linear acyclic dimer product, e.g., 1,3,6-octatriene, in high yield, in addition to 3-methyl-1,4,6-heptatriene and without the concomitant production of substantial quantities of undesirable polymer. Furthermore, we have found that the employment of the above noted aluminum to metal molar ratios enables the co-oligomerization of butadiene and ethylene to proceed to the formation of 1,4-hexadiene in high yield.

In conducting the oligomerization reaction, the conjugated aliphatic diene may be contacted either continuously or batch-wise with the aluminum compound-metal (0) complex catalyst composition, optionally in the presence of a suitable organic solvent. Suitable organic solvents may be those noted above in connection with the discussion of catalyst preparation procedures. The concentration of catalyst in the reaction mixture may advantageously range from about 0.01% to about 10.0% by weight of the diene monomer, although concentrations within the range of 0.1% to about 2.0% are usually most preferred. The temperature and pressure conditions under which the oligomerization reaction is carried out are subject to wide variation. The temperature may, for example, range from about 0° C. to about 180° C., although the range of 20° C. to 150° C. is generally most suitable.

Optimum pressure is dependent upon the particular monomer oligomerized. For example, in the oligomerization of butadiene, the pressure may advantageously range from about 10 to about 500 p.s.i.g. On the other hand, ethylene and butadiene may be advantageously cooligomerized using pressures up to 3000 p.s.i.g. or higher.

If desired, polymerization inhibitors may also be included in the reaction mixture, for instance in an amount of from about 0.001% to about 4.0% based on the weight of the aliphatic diene feed. Suitable polymerization inhibitors are well-known to the art and include phenol, catechol, p-tert-butyl catechol resorcinol, and hydroquinone.

Following completion of the reaction, conventional techniques may be employed to deactivate the catalyst composition and recover the desired acyclic oligomer products. One suitable catalyst deactivation procedure involves contacting the reaction mixture with aqueous methanol.

In producing 1,4-unsaturated acyclic compounds, ethylene and the conjugated diene may be employed in equimolar amounts as the feed. However, ethylene:diense mole ratios of from about 0.05 to about 10 may also be used with advantage.

The invention will now be further described in reference to the following specific examples, which are presented solely for the purpose of illustration and are not to be interpreted as limiting the scope of the invention.

EXAMPLE I

A bis-triphenylphosphine iron tricarbonyl complex is prepared by mixing 100 grams of methanol, 20 grams of $Fe(CO)_5$ (0.101 moles) and 75 grams of triphenylphosphine (0.285 mole) at 150° C. for 90 minutes.

Run 1a

One gram of the resultant bis-triphenylphosphine iron tricarbonyl complex is charged to a dry, evacuated 300 ml. autoclave with 18 mmoles of triethylaluminum in 24 ml. of benzene, 20 grams of benzene and 95 grams of butadiene. The mixture is heated with stirring at 135° C. for five hours. The catalyst is then deactivated by contacting the reaction mixture with 5 ml. of water. The product mixture subsequently recovered weighs 113 grams, which is equivalent to a butadiene conversion of 81.2%, assuming no benzene loss. Vapor phase chromatography (normalized) of the volatile product mixture indicates the following product distribution:

TABLE 1

|  | Wt. percent |
|---|---|
| 3-methyl-1,4,6-heptatriene | 4.75 |
| 1,3,6-octatriene | 73.5 |
| Cyclic oligomers | 5.05 |
| Backflush | 1.5 |
| Unknowns | 6.0 |

Run 1b

Run 1a is repeated, except that diethylaluminum chloride is used as the aluminum compound instead of triethylauminum. After recovery, the volatile products are subject to vapor phase chromatography with the following results:

TABLE 2

|  | Wt. percent |
|---|---|
| 3-methyl-1,4,6-heptatriene | 27.19 |
| 1,3,6-octatriene | 34.07 |
| Cyclic oligomers | 18.91 |
| Backflush | 18.32 |
| Unknowns | 1.52 |

It will be noted from the data set forth in Tables 1 and 2 that triethylaluminum and diethylaluminum chloride in conjunction with iron (0) complexes results in the formation of predominently acyclic oligomers, including a substantial quantity of 1,3,6-octatriene.

EXAMPLE II

A mixture of 2,000 ml. of 1,5-cyclooctadiene and 11.5 ml. of $Fe(CO)_5$ is heated for 380 minutes at 197° C. The carbon monoxide evolved by the reaction is slowly vented. The resultant reaction mixture is slowly centrifuged to recover an insoluble iron (0) complex of iron carbonyl and cyclooctadiene.

A dry, evacuated 300 ml. autoclave is charged with 0.5 grams of the iron (0) complex, 10 millimoles (mmoles) of diethylaluminum chloride and 20 grams of benzene. Butadiene in the amount of 100 grams is pressured into the autoclave and the mixture is heated at 120° C.–135° C. for two (2) hours with stirring. Forty-seven (47) grams of reaction mixture is subsequently removed from the autoclave, which represents a butadiene conversion of 21%, assuming no solvent loss. The volatile product mixture is found to contain 54.5 weight percent 3-methyl-1,4,6-heptatriene; 37.2 weight percent 1,3,6-octatriene and 8.3 weight percent cyclic oligomers upon vapor phase chromatography.

EXAMPLE III

To a stirred 300 ml. autoclave is charged 2 grams of $Fe(CO)_5$, 1.50 grams of $AlH_3$ in 25 ml. of benzene, 20 grams of benzene and 108 grams of butadiene. The mixture is heated at a temperature of 50° C. for 20 hours. The catalyst is then deactivated with aqueous methanol and 136 grams of reaction product is subsequently recovered, which represents a butadiene conversion of 90%, assuming no solvent loss. Normalized vapor phase chromatography data indicates 57 weight percent 1,3,6-octatriene and 41 weight percent 3-methyl-1,4,6-heptatriene in the volatile product mixture.

EXAMPLE IV

A dry, evacuated 500 ml. autoclave is charged with 100 mmoles of ferric acetylacetonate, 400 mmoles of triphenylphosphite, 100 ml. of benzene and 260 ml. of a 20% by weight solution of triethylaluminum (400 mmoles) in benzene. The contents of the autoclave are stirred for 360 minutes at a temperature of 30–50° C., after which time a solid iron (0) complex is recovered.

EXAMPLE V

A dry, evacuated 500 ml. autoclave is charged with 6.2 mmoles of ferric chloride, 6.2 mmoles of triphenylphosphine, 20 ml. of benzene and 16.2 ml. of a 20 weight percent solution of triethylaluminum (24.8 mmoles) in benzene. Aluminum:iron molar ratio is, therefore, 4:1, while the phosphorus:iron molar ratio is 1:1. The contents of the autoclave are stirred for 240 mintues at room temperature, following which 108 grams of butadiene are introduced under pressure. After a reaction period 24 hours at room temperature, the product mixture is recovered. Butadiene conversion is 43%. The volatile product mixture is found to have the following analysis by vapor phase chromatography (normalized):

TABLE 3

|  | Wt. percent |
|---|---|
| 3-methyl-1,4,6-heptatriene | 34.73 |
| 1,3,6-octatriene | 40.69 |
| Cyclic oligomers | 9.72 |
| Backflush | ---- |
| Unknowns | 13.65 |

EXAMPLE VI

Using the equipment as in Examples IV and V, 3.0 mmoles of iron acetylacetonate, 60 ml. of benzene and 7.8 ml. of a 20% by weight solution of triethyl aluminum in benzene (12.0 mmoles) are mixed together while 0.126 grams of carbon monoxide are introduced under a pressure of 20 p.s.i.g. The alumininum:iron molar ratio is, therefore, 4:1 and the CO:Fe ratio is 1.5:1. After a mixing time of 15 minutes, the autoclave temperature is raised to 100° C., and 103 grams of butadiene are introduced under a pressure of 50 p.s.i.g. Following a reaction period of four (4) hours, the product mixture is recovered by conventional techniques. Butadiene conversion is 100%. Vapor phase chromatography (normalized) indicates the following product distribution in the volatile product mixture:

TABLE 4

| | Wt. Percent |
|---|---|
| 3-methyl-1,4,6-heptatriene | 16.40 |
| 1,3,6-octatriene | 24.00 |
| Cyclic oligomers | 10.01 |
| Unknown | 48.5 |

EXAMPLE VII

Example VI is repeated except that 3.0 mmoles of triphenylphosphine and 0.25 grams of carbon monoxide are mixed with the iron acetylacetonate and triethylaluminum to prepare the iron (0) complex-triethylaluminum catalyst composition. Thus, the Al:Fe ratio is as started in Example VI, above, while the CO:Fe ratio is about 3.0:1 and the P:Fe ratio is 1:1. Vapor phase chromatography indicates the following product distribution:

TABLE 5

| | Wt. Percent |
|---|---|
| 3-methyl-1,4,6-heptatriene | 3.55 |
| 1,3,6-octatriene | 81.05 |
| Cyclic oligomers | 3.9 |
| Backflush | 10.0 |
| Unknown | 5.3 |

EXAMPLE VIII

Example VI is repeated, except that 14.6 ml. of the benzene solution of triethylaluminum (22.8 mmoles) is charged to the autoclave. The Al:Fe ratio is, therefore, about 8 compared to 4 as in Example VI. Butadiene conversion and product distribtuion are substantially the same as in Example VI.

EXAMPLE IX

Example VI is repeated except that 21.8 ml. of a 20% by weight solution of tri-i-butyl aluminum (24.8 mmoles) is charged to the autoclave in lieu of triethylaluminum. Conversion of butadiene is 95%, assuming no solvent loss. Product distribution is substantially the same as in Example VI.

EXAMPLE X

Example VI is repeated except that a 20% by weight suspension of aluminum trihydride in benzene (24.8 mmoles) is charged to the autoclave in lieu of triethylaluminum. Conversion of butadiene is 90%, assuming no solvent loss. Vapor phase chromatography of the recovered product mixture indicates a predominent proportion of the acyclic oligomers of butadiene in the volatile product mix.

EXAMPLE XI

A 500 ml. stainless steel autoclave is charged with 1.1 grams (3.0 mmoles) of iron (III) acetylacetonate in 60 grams of benzene. The autoclave is closed and 0.252 gram of carbon monoxide (9.0 mmoles) is added followed by 13.0 ml. of a 20 weight percent solution of triethylaluminum in benzene (20.0 mmoles). The resultant mixture is stirred while 108 grams (2.0 moles) of butadiene and 6.15 grams (2.2 moles) of ethylene are added. The temperature is then raised to 50° C. and held there for 20 hours while the vessel is agitated. At the end of this time the autoclave is cooled to room temperature and vented. The autoclave contains 188 grams of a reddish-brown liquid. Vapor phase chromatography indicates the following product distribution:

TABLE 6

| | Wt. Percent |
|---|---|
| 1,4-hexadiene | 46.81 |
| 2,4-hexadiene | 1.66 |
| 3-ethyl-1,4-hexadiene | 1.02 |
| 3-methyl-1,4-heptadiene | 4.30 |
| Backflush | 31.32 |
| Unknowns | 14.89 |

While the invention has been described above with respect to certain preferred embodiments thereof, it will be understood by those skilled in the art that various changes and modifications may be made without departing from the spirit and scope of the invention, and it is intended to cover all such changes and modifications in the appended claims.

Therefore, we claim:

1. Process comprising contacting a conjugated aliphatic diene at a temperature of from about 0° C. to about 180° C. with from about 0.01% to about 10% by weight based on said diene of a catalyst composition comprising:

(A) a complex of metal in its zero valence state with a molecular ligand, said metal being selected from the group consisting of vanadium, manganese, rhenium, iron, ruthenium, osmium, cobalt, rhodium and iridium and said ligand being selected from the group consisting of carbon monoxide, triorgano esters of trivalent Group V–A elements, conjugated aliphatic dienes, cycloaliphatic compounds containing at least two ethylenic double bonds, functionally substituted olefins, heterocyclic compounds and hydrocarbyl esters of sulfur acids and (B) from about 0.5 to about 20 moles per mole of said complex of an aluminum compound of the formula $R_aAlX_b$, wherein R is selected from the group consisting of hydrocarbyl and hydride groups, X is selected from the group consisting of halide and hydrocarbyloxy groups, $a$ is from 1 to 3, $b$ is from 0 to 2 and the sum of $a$ plus $b$ is 3, and recovering an oligomer of said diene.

2. Process as in claim 1 wherein $a$ is 3 in said formula of said aluminum compound.

3. Process as in claim 1 wherein said metal is iron.

4. Process as in claim 1 wherein said molecular ligand is selected from the group consisting of carbon monoxide, triorgano esters of trivalent phosphorus, arsenic and antimony and cycloaliphtic compounds containing at least two ethylenic double bonds.

5. Process as in claim 1 wherein said conjugated diene is butadiene.

6. Process as in claim 1 wherein a mixture of said conjugated diene with ethylene is contacted with said catalyst composition.

7. Process as in claim 6 wherein said conjugated diene is butadiene.

8. Process as in claim 1 wherein said metal (0) complex is prepared by interacting a carbonyl of said metal with another of said molecular ligands, whereby at least one carbonyl group is replaced by said other molecular ligand.

9. Process as in claim 4 wherein said catalyst composition is prepared by interacting a compound of said metal wherein said metal is in a positive valence state with said aluminum compound and said molecular ligand, the molar ratio of said aluminum compound to said metal compound being at least 1:1.

10. Process as in claim 9 wherein $a$ is 3 in said formula of said aluminum compound.

11. Process as in claim 1 wherein said molar ratio of aluminum to said metal is from about 2:1 to about 10:1.

12. Process as in claim 8 wherein said metal carbonyl is iron pentacarbonyl, said aluminum compound is triethylaluminum and said molecular ligand is triphenylphosphine, the molar ratio of aluminum:iron being from about 2 to about 10, the molar ratio of CO:iron being about 3 and the molar ratio of triphenylphosphine:iron being about 2.

13. Process as in claim 9 wherein said metal compound is an iron (III) compound and said aluminum compound is triethylaluminum, the molar ratio of aluminum:iron being from about 2 to about 10, and the molar ratio of said molecular ligand to iron being from about 1 to about 5.

14. Process as in claim 13 wherein said iron (III) compound is ferric acetylacetonate.

15. Process as in claim 13 wherein said iron (III) compound is a ferric halide.

16. Process as in claim 13 wherein said molecular ligand is carbon monoxide.

17. Process as in claim 13 wherein said molecular ligand is triphenylphosphine.

18. Process as in claim 13 wherein carbon monoxide and triphenylphosphine are employed in combination as molecular ligands.

References Cited

UNITED STATES PATENTS

| | | | |
|---|---|---|---|
| 3,306,948 | 2/1967 | Kealy | 260—680 |
| 3,219,716 | 11/1965 | Wittenberg et al. | 260—666 |

FOREIGN PATENTS 1,018,369  1/1966  Great Britain.

DELBERT E. GANTZ, Primary Examiner

J. D. MEYERS, Assistant Examiner

U.S. Cl. X.R.

260—666